United States Patent [19]

Suzuki et al.

[11] Patent Number: 4,572,714
[45] Date of Patent: Feb. 25, 1986

[54] ROUTER BIT

[75] Inventors: Takashi Suzuki; Ryohei Fukuda, both of Utsunomiya; Kouji Takahashi, Mibumachi, all of Japan

[73] Assignee: Fuji Jukogyo Kabushiki Kaisha, Tokyo, Japan

[21] Appl. No.: 644,149

[22] Filed: Aug. 24, 1984

Related U.S. Application Data

[63] Continuation of Ser. No. 332,045, Dec. 18, 1981, abandoned.

[30] Foreign Application Priority Data

Dec. 24, 1980 [JP] Japan .................................. 55-183174
Dec. 24, 1980 [JP] Japan .................................. 55-183175

[51] Int. Cl.$^4$ .......................... B23B 51/00; B26D 1/12
[52] U.S. Cl. ...................................... 408/230; 407/53; 407/54
[58] Field of Search .................... 409/132; 407/54, 53; 408/229, 230, 226, 715; 144/218; 145/130

[56] References Cited

U.S. PATENT DOCUMENTS

| | | | |
|---|---|---|---|
| 2,778,252 | 1/1957 | Oxford, Jr. | 408/7.5 |
| 3,701,188 | 10/1972 | Wall et al. | 407/54 |
| 3,749,189 | 7/1973 | Boehm | 408/230 |
| 3,913,196 | 9/1975 | Maday | 407/54 |
| 4,227,837 | 9/1980 | Yodoshi | 407/53 |
| 4,274,771 | 6/1981 | Nishimura | 408/230 |
| 4,395,167 | 7/1983 | Maternus | 407/54 |
| 4,475,850 | 10/1984 | Penoza et al. | 408/229 X |
| 4,480,949 | 11/1984 | De Bogart | 408/230 X |

Primary Examiner—William R. Briggs
Attorney, Agent, or Firm—Martin A. Farber

[57] ABSTRACT

A router bit comprises a shank and a fluted portion, for example two or four fluted bit. The two fluted bit comprises two upper cutting edges higher than a predetermined standard line and two lower cutting edges lower than the standard point. Helixes of the upper and lower cutting edges are twisted in the opposite direction relative to each other. Helix angles of the upper and lower cutting edges are equal or different in absolute angle.

2 Claims, 12 Drawing Figures

ROUTER BIT

This application is a continuation of application Ser. No. 332,045, filed 12-18-81, abandoned.

BACKGROUND OF THE INVENTION

The present invention relates to a router bit useful to trim a composite material made by impregnating resin into laminated cloth made of carbon fiber or Kevler (trademark).

Since such a composite material has high weight and high strength, the material is used for making the body of an aircraft or vehicle. The characteristics of the composite material is varied dependent on the type of combined materials, treatment temperature, construction and other factors. Therefore, it is very difficult to cut the composite material.

FIG. 6a shows a section of material b in trimming with a right-hand router bit a, FIG. 6b shows a section with a left-hand router bit a' and FIG. 6c shows a section with a strait fluted bit a''. In the trimming with the right-hand router bit a, fluff and burrs are left on the surface of the material, and with the left-hand rooter but a', fluff and burrs are left on the underside of the material, and with the straight fluted bit a'', fluff and burrs are formed on both sides. In addition, a distance between the position of the trimming and an edge of a clamping jig c must be provided. Accordingly, the material vibrates about the trimming portion, which causes delamination, a decrease of strength and fatigue fracture of the composite material.

SUMMARY OF THE INVENTION

An object of the present invention is to provide a router bit which can cut a composite material without leaving fluff and burrs on the material.

Another object of the present invention is to provide a router bit which is capable of preventing the vibration of the material during the cutting.

According to the present invention, there is provided a router bit comprising a shank and a fluted portion, the fluted portion comprising at least two continuous upper cutting edges higher than a predetermined standard line and at least two continuous cutting edges lower than the standard point, helixes of the upper and lower cutting edges being twisted in the opposite direction each other and overlapping in a limited overlapping range at the standard point, said overlapping range being substantially less than the length of said fluted portion the axial length of the overlapping range being less than 1/10 of the outermost diameter of said fluted portion, said fluted portion being formed with cutter edges on the point of said bit for drilling a material, at least one of said upper cutting edges being different from the other of said upper cutting edges in length and at least one of said lower cutting edges being different from the other of said lower cutting edges in length, and ends of the cutting edges in the overlapping range being equiangularly disposed.

Other objects and features of the present invention will be fully described with reference to the accompanying drawings.

DESCRIPTION OF PREFERRED EMBODIMENTS

Figure 1:
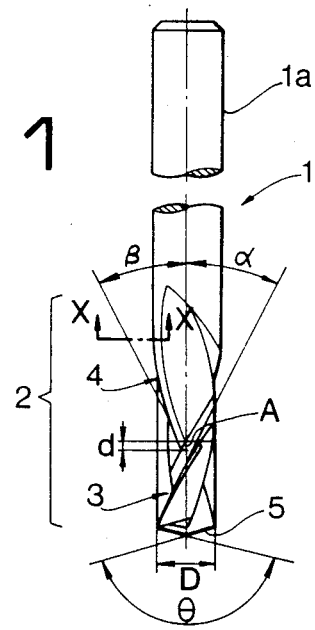
FIG. 1 is a side view of a router bit according to the present invention.
Figure 2:
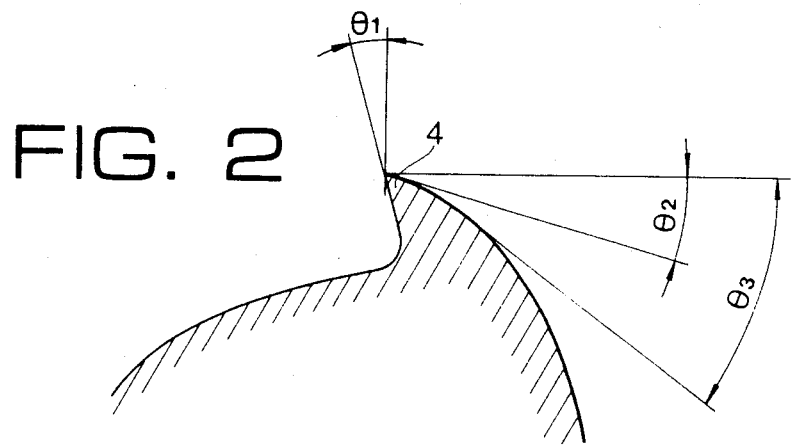
FIG. 2 is an enlarged sectional view of a portion of the router bit taken along the line X—X of FIG. 1.

Referring to FIGS. 1 and 2, reference numeral 1 designates a two-fluted router bit having a shank 1a and a fluted portion 2. The fluted portion 2 comprises an upper fluted portion and a lower fluted portion, with respect to a standard line A. The upper fluted portion comprises two upper cutting edges 4 and the lower fluted portion comprises two lower cutting edges 3. The upper cutting edges 4 are twisted in a counterclockwise direction and the lower cutting edges 3 are twisted in a clockwise direction. The helix angle $\alpha$ of the lower cutting edge 3 is equal to the helix angle $\beta$ of the upper cutting edge 4. The flute length of the upper portion is equal to that of the lower portion. As shown in FIG. 2, each of the cutting edges 3 and 4 has an axial rake angle $\theta 1$ (positive), a primary relief angle $\theta 2$ and a secondary clearance angle $\theta 3$. The cutting edges 3 and 4 overlap each other over a range d (FIG. 1) at the standard line A. Flutes of both portions also overlap each other. On the point of the bit, cutting cutter edges 5 are provided for drilling the material.

Figure 3:
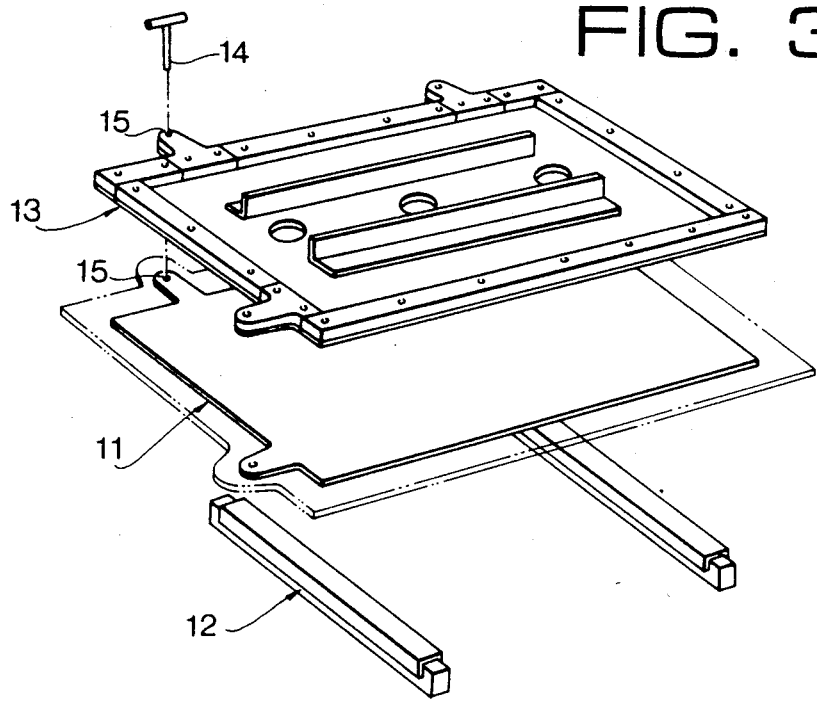
FIG. 3 is an exploded perspective view illustrating a relationship between a composite material and a clamping jig.
Figure 4:
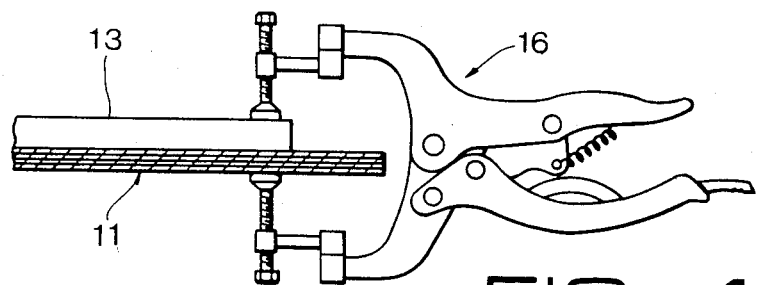
FIG. 4 is a sectional view of a composite material clamping by a clamp shown in elevational view.
Figure 5:
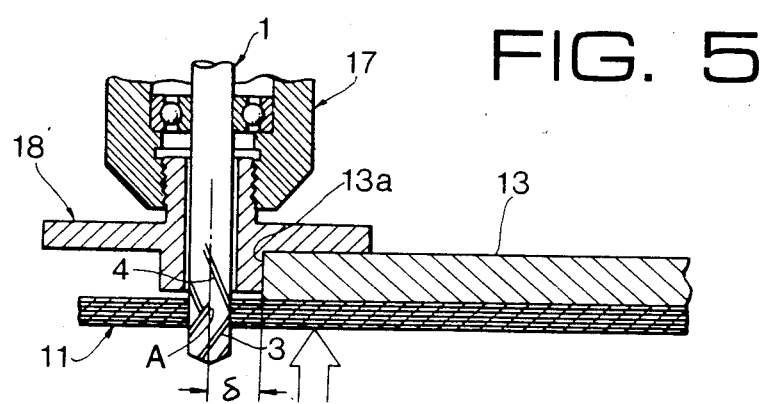
FIG. 5 is a sectional view showing a trimming operation with the router bit of FIG. 1.

Describing a cutting operation with the router bit with reference to FIGS. 3 to 5, a plane composite material 11 is put on supports 12 and a trimming jig 13 is put on the composite material 11. At suitable positions of the material 11 and jig 13, a plurality of tooling holes 15 are provided, corresponding holes formed in both members being in alignment with each other. A tooling pin 14 is inserted into corresponding holes 15 and both members are clamped by a clamp 16 as shown in FIG. 4.

As shown in FIG. 5, the router bit 1 is fixed to a hand router 17 having a profiling stylus 18. The hand router 17 is so disposed that the standard line A is positioned at a location substantially equal to the center of the thickness of the material 11. The hand router 17 is moved along a contour (template) 13a of the triming jig 13, so that the composite material is trimmed by the router bit 1.

Since the lower cutting edges 3 are twisted in a clockwise direction and the upper cutting edges 4 are twisted in a counterclockwise direction, fluff raised by both cutting edges is oriented toward the central portion of the width of the material and is perfectly cut of by the cutting edges 3 and 4. Therefore fluff and burrs do not remain on both surfaces of the composite material 11.

Since the helix angles α and β of both cutting edges are substantially equal to each other, the force exerted on the material in the upper direction, which occurs by the lower cutting edges 3, and the force in the lower direction caused by the upper cutting edges 4 balance each other. Therefore, the composite material does not vibrate to a great degree in spite of an offset distance δ. Thus, delamination of the composite material may be prevented.

It is necessary to decrease the overlap range d so as to be as small as possible in order to prevent vibration of the material 11. A preferable length of the overlap range d is less than 1/10 of the bit diameter D. A preferable helix angle α(β) is less than 40° in order to obtain a smooth cut face and to prevent the vibration of the material. A preferable axial rake angle $\theta 1$ and a primary relief angle $\theta 2$ are between 10° and 20° and the most preferable angle is 15°. It is preferable to select the secondary clearance angle $\theta 3$ between 30° and 40° and the most preferable angle is 35°.

An example of the router bit according to the present invention is as follows:
Bit diameter: 3/16 in. (4.76 mm), two-fluted bit;
Helix angle of the lower cutting edge: 30° (right-hand helix)
Helix angle of the upper cutting edge: 30° (left-hand helix)
Overlap length: 0.45 mm
Shank diameter: ¼ in. (6.35 mm)
Material: cemented carbide An experiment was conducted to trim a plane composite material with the above rooter bit at 23,000 rpm. A smooth cut face without fluff, burrs and delamination was obtained. Further it was confirmed that a reliable drilling of the material was carried out with a router bit having a point angle θ of 135°.

Figure 6A:
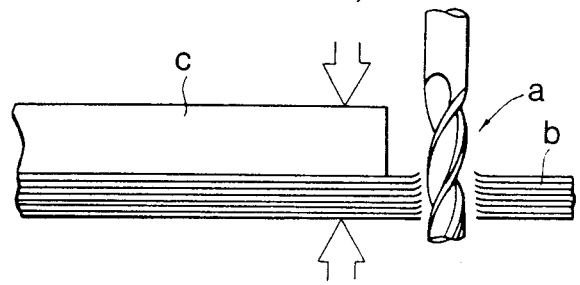
FIGS. 6a to 6c show trimming operations with conventional router bits.
Figure 6B:
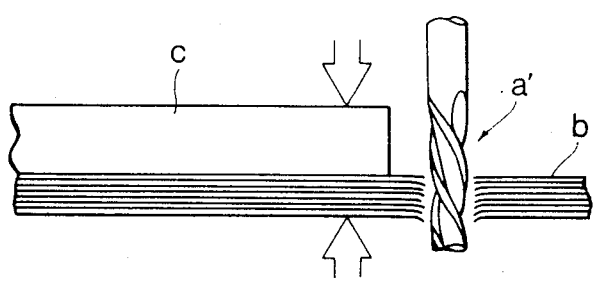
Figure 6C:
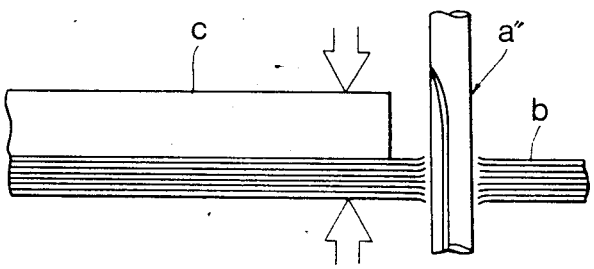

Cutting speed with conventional bits as shown in FIGS. 6a to 6c is 500 mm/min at most, since the cutting speed cannot be increased because of a low cutting ability. To the contrary, it is possible to increase the cutting speed to 3500 mm/min with the router bit of the present invention. In addition, durability of the bit may be increased by properly selecting the cutting edge angles $\theta 1$, $\theta 2$ and $\theta 3$. Durability of the router bit according to the present invention is about six times as long as that of a conventional bit.

Figure 7:
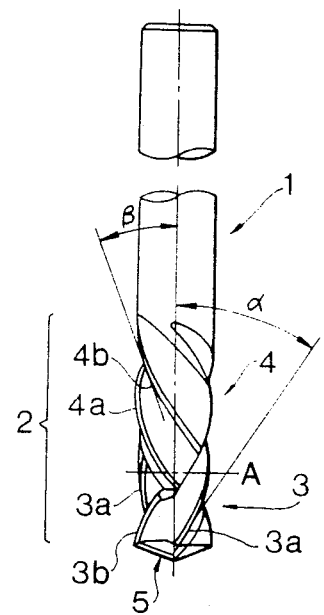
FIG. 7 is a side view partly broken-away showing another embodiment of the present invention.

FIG. 7 shows another embodiment of the present invention. Although the illustrated router bit is a four-fluted bit, the present invention is not limited to such a bit. In the drawings, the same parts as the router bit of FIG. 1 are identified by the same references. The routerf bit has a suitable axial rake angle $\theta 1$, a primary relief angle $\theta 2$ and a secondary clearance angle $\theta 3$. The helix angle α of the lower cutting edge 3 having a right-hand helix is different from the helix angle β of the upper cutting edge 4 having a left-hand helix. For example, the angle α is about 45° and β is about 10°. In the overlap range, one cutting edge 3a of the lower cutting edges 3 is longer than the other cutting edge 3b, and the upper cutting edge 4a is longer than the cutting edge 4b, but the ends of these cutting edges are equiangularly disposed in cross section.

Figure 8:
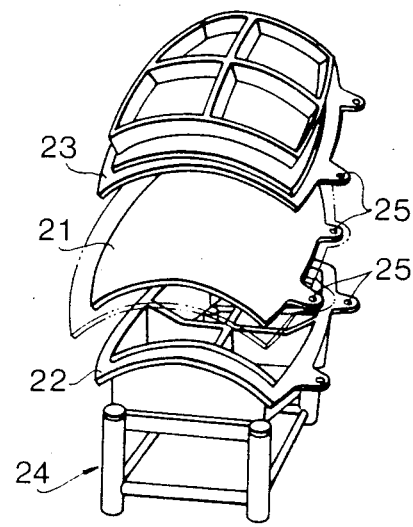
FIG. 8 is a perspective view illustrating a relation between a composite material and a clamping jig.
Figure 9:
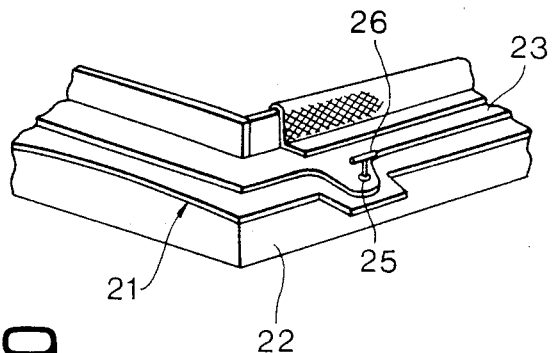
FIG. 9 is a perspective view partly broken-away showing a part of a clamped state of the material.

Referring to FIG. 8 showing a composite material having a convex shape which is put on a lower form 22 set on a table 24 and an upper form 23 is put on the material 21. The material is clamped by a clamp using pins 26 inserted into holes 25 in the same manner as the previous embodiment.

Figure 10:
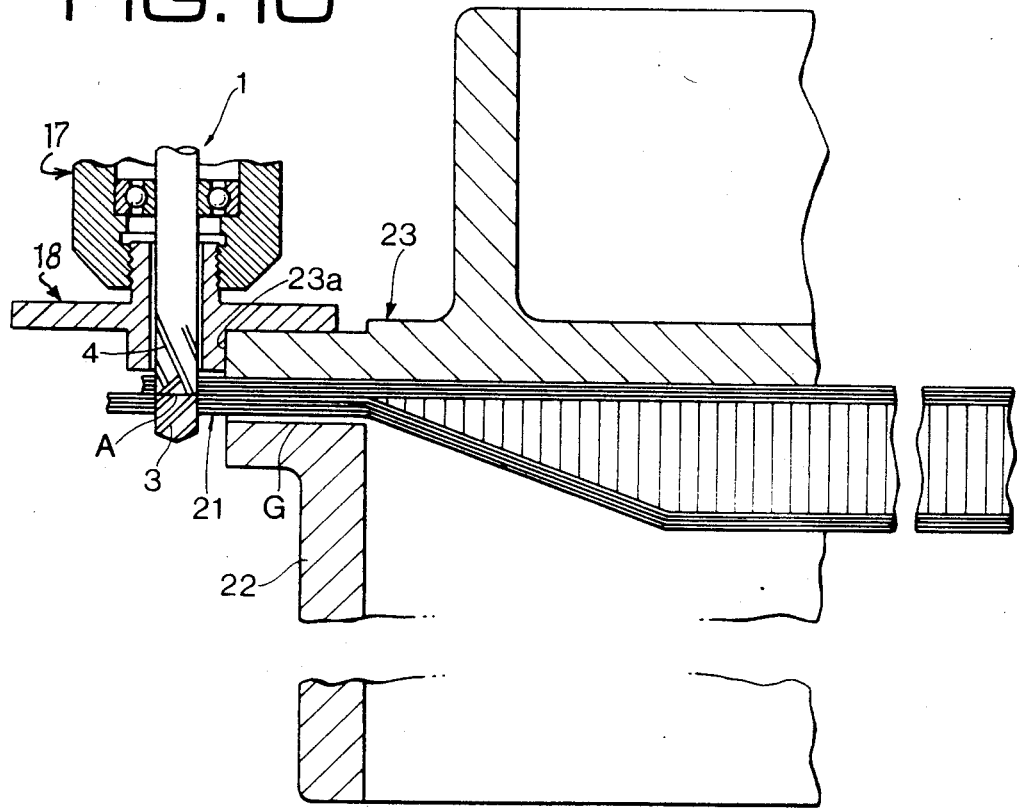
FIG. 10 is a sectional view partly broken-away showing a trimming operation with the router bit of FIG. 7.

Generally a composite material used for an aircraft has a complex curvature in section and often includes a honeycomb core as shown in FIG. 10. The upper form 23 can be exactly formed into the shape of the composite material to be trimmed from a master model. However, it is difficult to form the lower form 22 into the underside shape of the material including the honeycomb core. Accordingly, inevitably a gap G is left between the material 21 and the lower form 22 as shown in FIG. 10. Therefore, when the material is trimmed with a conventional end mill or bit, the material vibrates primarily because of the gap G, which will cause delamination of the material and a great deal of burrs.

In accordance with the router bit of the second embodiment, since the helix angle α of the lower cutting edge 3 is greater than the angle β of the upper cutting edge 4, the composite material 21 is drawn up and pressed against the upper form 23 and held in such a condition. Thus, the composite material can be trimmed with the rooter bit without vibrating and occurrence of delamination.

Since there is provided double cutting edges in the overlap range compared with the upper or lower cutting edges, burrs aggregated about the standard line A may be perfectly cut off to provide a smooth cut face.

It is preferable to select the helix angle β less than ⅓ of the helix angle α. The axial rake angle $\theta 1$ (posituve) of the router bit of FIG. 7 is preferably between 15° and 25° and 20° is the most preferable. The preferably primary relief angle $\theta 2$ is between 10° and 20° and 15° is the most preferable. The secondary clearance angle $\theta 3$ is selected between 20° and 30° and the most preferable angle is 25°.

An example of the router bit of the second embodiment has a bit diameter of ¼ in. (6.35 mm, four-fluted bit), a cutting edge angle α of 45° and a cutting edge angle β of 10°.

Although the composite material 21 of FIG. 8 has an upper surface as a standard surface, a composite material having an underside as a standard surface is trimmed by another router bit having an upper cutting edge of a large helix angle β and a lower cutting edge of a small helix angle α. Thus, the material is pressed against a lower standard form and trimmed in the same manner as the above-described embodiment.

What is claimed is:
1. A router bit adapted for drilling a material comprising
   a shank, and
   a fluted portion extending from the shank,
   said fluted portion comprising at least two upper continous cutting edges higher than a predetermined circumferential standard line on said fluted portion and at least one of said upper continuous cutting edges extending lower than said standard line and at least two lower continuous cutting edges lower than said standard line and at least one of said lower continuous cutting edges extending higher than said standard line,
   said upper and lower continuous cutting edges form helixes which are twisted in opposite directions relative to each other so as when rotated to produce force components on the material toward said standard line,
   said upper and lower continuous cutting edges overlap in a limited overlapping range at the standard line less than the entire axial lengths of said cutting edges, said overlapping range being substantially less than the length of said fluted portion, the axial length of the overlapping range being less than 1/10 of the outermost diameter of said fluted portion, and said fluted portion being formed with cutter edges on a point of said bit for drilling the material, and wherein helix angles of one of said upper and lower continuous cutting edges respectively are different in absolute angle so as when rotated the cutting edges having the larger of said helix angles produce a greater force component on the material toward said standard line than the cutting edges having the smaller of said helix angles.

2. The router bit according to claim 1, wherein the smaller of said helix angles is less than $\frac{1}{3}$ of the larger of said helix angles.

* * * * *